(12) United States Patent
Chang et al.

(10) Patent No.: US 8,817,674 B2
(45) Date of Patent: Aug. 26, 2014

(54) APPARATUS AND METHOD FOR PERFORMING UPLINK COMMUNICATION BY MEANS OF RELAY STATION IN WIRELESS COMMUNICATION SYSTEM

(75) Inventors: Young-Bin Chang, Anyang-si (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 13/280,535

(22) Filed: Oct. 25, 2011

(65) Prior Publication Data

US 2012/0099492 A1   Apr. 26, 2012

(30) Foreign Application Priority Data

Oct. 26, 2010   (KR) .......................... 10-2010-0104377

(51) Int. Cl.
*H04B 3/36* (2006.01)
*H04J 3/00* (2006.01)
*H04W 4/00* (2009.01)

(52) U.S. Cl.
USPC ................ 370/280; 370/279; 370/328; 455/7

(58) Field of Classification Search
USPC ........... 370/279–321, 342–345; 455/442–456
See application file for complete search history.

(56) References Cited

U.S. PATENT DOCUMENTS

| 7,796,546 | B2* | 9/2010 | Lee et al. ...................... 370/315 |
| 8,014,338 | B2* | 9/2011 | Lee et al. ...................... 370/324 |
| 8,040,826 | B2* | 10/2011 | Lee et al. ...................... 370/293 |
| 8,160,006 | B2* | 4/2012 | Chang et al. .................. 370/329 |
| 8,218,461 | B2* | 7/2012 | Chang et al. .................. 370/279 |
| 8,266,491 | B2* | 9/2012 | Lee et al. ...................... 714/749 |
| 2008/0089309 | A1* | 4/2008 | Groleau et al. ............... 370/342 |
| 2011/0051634 | A1* | 3/2011 | Lim et al. ...................... 370/281 |
| 2011/0069743 | A1* | 3/2011 | Chang et al. .................. 375/211 |
| 2011/0070821 | A1* | 3/2011 | Chun et al. ........................ 455/7 |
| 2011/0103270 | A1* | 5/2011 | Chang et al. .................. 370/279 |
| 2012/0044833 | A1* | 2/2012 | Lee et al. ...................... 370/254 |

* cited by examiner

*Primary Examiner* — Man Phan
(74) *Attorney, Agent, or Firm* — Jefferson IP Law, LLP

(57) ABSTRACT

An apparatus and method for performing Uplink (UL) communication by a Relay Station (RS) in a wireless communication system are provided. The RS receives a Transmit/receive Transition Gap (TTG) and a Receive/transmit Transition Gap (RTG) of a Base Station (BS) during a network entry process of the RS, receives, from the BS, an idle time R_IdleTime between frames used in the RS, and determines a structure of a UL frame. In the alternative, the RS determines a time interval Tad or an idle time R_IdleTime according to a predetermined scheme, and transmits the Tad or the R_IdleTime to the BS. The proposed apparatus and method reduce an overhead of a frame structure when the RS transitions from a transmission mode to a reception mode or from a reception mode to a transmission mode, the frame structure being for frames of the BS and it adjacent RS, thereby reducing interference.

12 Claims, 9 Drawing Sheets

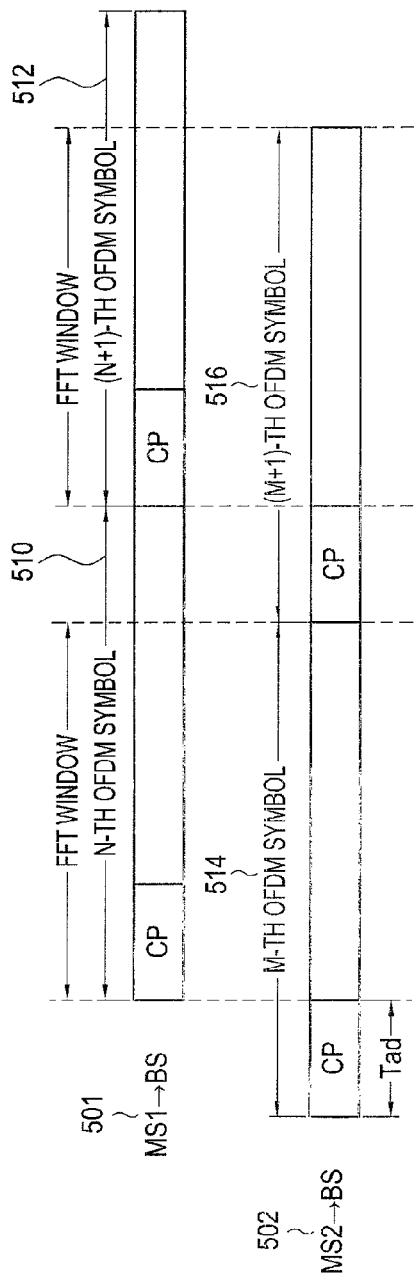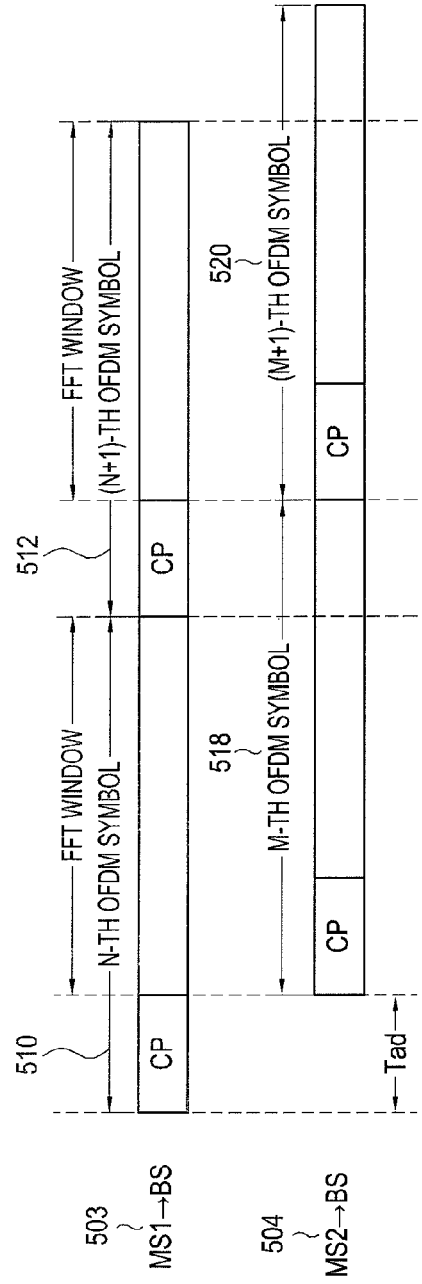
FIG.5A
FIG.5B

APPARATUS AND METHOD FOR PERFORMING UPLINK COMMUNICATION BY MEANS OF RELAY STATION IN WIRELESS COMMUNICATION SYSTEM

PRIORITY

This application claims the benefit under 35 U.S.C. §119(a) of a Korean Patent Application filed in the Korean Intellectual Property Office on Oct. 26, 2010 and assigned Serial No. 10-2010-0104377, the entire disclosure of which is hereby incorporated by reference.

BACKGROUND OF THE INVENTION

1. Field of the Invention

The preset invention relates to a wireless communication system. More particularly, the present invention relates to an apparatus and method for providing relay services in a wireless communication system using a relay scheme.

2. Description of the Related Art

In a communication system, signaling and data traffic is exchanged between a fixed Base Station (BS) and a Mobile Station (MS) over a direct link. Much research has been conducted to provide increased MS mobility and flexibility as per a configuration of a wireless network in a communication system, and to provide more efficient services in the wireless environment in which a change in traffic distribution and call demand is significant. One of the communication systems under study is a relay communication system employing a multi-hop relay-type data transfer scheme that uses a Relay Station (RS). The relay communication system may reconfigure the network in quick response to a change in a communication environment, making it possible to efficiently operate the entire network.

FIGS. 1A and 1B illustrate interference occurring in a wireless communication system and a relay communication system, respectively according to the related art.

Referring to FIG. 1A, a MS1 102 is served by a BS1 101, and a MS2 103 is served by a BS2 104.

While the BS1 101 is in communication with the MS1 102, the MS2 103 may transmit a communication signal to the BS2 104. In this case, however, a signal from the MS2 103 to the BS2 104 may interfere with the signal between the MS1 102 and the BS1 101.

Likewise, while the BS2 104 is in communication with the MS2 103, the MS1 102 may transmit a communication signal to the BS1 101. In this case, a signal from the MS1 102 to the BS1 104 may interfere with the signal between the MS2 103 and the BS2 104.

Referring to FIG. 1B, while a BS 111 is in communication with a MS3 112, a MS4 113 may transmit a communication signal to an RS 114. In this case, a signal transmitted from the MS4 113 may interfere with the signal between the MS3 112 and the BS 111. Likewise, while the RS 114 is in communication with the MS4 113, the MS3 112 may transmit a communication signal to the BS 111. In this case, a signal from the MS3 112 may interfere with the signal between the MS4 113 and the RS 114.

In these related art communication systems, timing in an Uplink (UL) is controlled in order to reduce interference signals in a BS and adjacent stations, such as another BS or RS. To this end, there is a need to efficiently configure UL frames used in the RS.

SUMMARY OF THE INVENTION

Aspects of the present invention are to address at least the above-mentioned problems and/or disadvantages and to provide at least the advantages described below. Accordingly, an aspect of the present invention is to provide an apparatus and method for supporting relay services in a wireless communication system employing a relay scheme.

Another aspect of the present invention is to provide an Uplink (UL) frame configuration method for supporting relay services in a wireless communication system, and an apparatus supporting the same.

Another aspect of the present invention is to provide an apparatus and method for reducing overhead for a transmit/receive transition time of a Relay Station (RS) in a wireless communication system.

Another aspect of the present invention is to provide an apparatus and method for reducing UL interference between a Base Station (BS) and an RS in a wireless communication system.

Another aspect of the present invention is to provide a frame configuration apparatus and method for reducing frame overhead occurring because of transmit/receive transition in an UL frame of an RS.

In accordance with an aspect of the present invention, a method for performing Frequency Division Duplex (FDD) Uplink (UL) communication by a RS in a wireless communication system using a relay scheme is provided. The method includes receiving an idle time IdleTime that is disposed between frames that a BS uses in a network entry process, receiving, from the BS, an idle time R_IdleTime that is disposed between frames used in the RS, determining a time interval Tad that is disposed between a UL relay zone and a UL access zone used in the RS according to a difference between the IdleTime and the R_IdleTime, and performing communication with the BS and at least one Mobile Station (MS) using a UL frame structure that is determined according to the Tad.

In accordance with another aspect of the present invention, a method for performing Time Division Duplex (TDD) Uplink (UL) communication by a Relay Station (RS) in a wireless communication system using a relay scheme is provided. The method includes receiving a Transmit/receive Transition Gap (TTG) and a Receive/transmit Transition Gap (RTG) of a Base Station (BS) during a network entry process of the RS, receiving, from the BS, an idle time R_IdleTime that is disposed between frames used in the RS, determining a time interval Tad that is disposed between a UL relay zone and a UL access zone used in the RS according to a difference between the TTG and the R_IdleTime, and performing communication with the BS and at least one Mobile Station (MS) using a UL frame structure determined according to the Tad.

In accordance with further another aspect of the present invention, a Relay Station (RS) apparatus for performing Frequency Division Duplex (FDD) Uplink (UL) communication in a wireless communication system using a relay scheme is provided. The RS apparatus includes a transmission device, a reception device for receiving an idle time IdleTime between frames that a Base Station (BS) uses in a network entry process, and for receiving, for the BS, an idle time R_IdleTime that is disposed between frames used in the RS, a timing controller for determining a structure and a timing of a UL frame according to a time interval Tad that is disposed between a UL relay zone and a UL access zone used in the RS, and for controlling the transmission device and the reception device by generating a control signal for transmitting and receiving a signal according to the determined structure and timing of the UL frame, and a Radio Frequency (RF) switch for connecting a signal exchanged with the BS and at least one Mobile Station (MS) to the transmission device and the reception device, the RF switch connecting the signal under control of the timing controller. The Tad is determined according to a difference between the IdleTime and the R_IdleTime.

In accordance with yet another aspect of the present invention, a Relay Station (RS) apparatus for performing Time Division Duplex (TDD) Uplink (UL) communication in a wireless communication system using a relay scheme is provided. The RS apparatus includes a transmission device, a reception device for receiving a Transmit/receive Transition Gap (TTG) and a Receive/transmit Transition Gap (RTG) of a Base Station (BS) in a network entry process, and for receiving, from the BS, an idle time R_IdleTime that is disposed between frames used in the RS, a timing controller for determining a structure and a timing of a UL frame according to a time interval Tad that is disposed between a UL relay zone and a UL access zone used in the RS, and for controlling the transmission device and the reception device by generating a control signal for transmitting and receiving a signal according to the determined structure and timing of the UL frame, and a Radio Frequency (RF) switch for connecting a signal exchanged with the BS and at least one Mobile Station (MS) to the transmission device and the reception device. The RF switch connecting the signal under control of the timing controller. The Tad is determined according to a difference between the TTG and the R_IdleTime.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A and 5B illustrate UL frames received at an adjacent station in an OFDM communication system according to an exemplary embodiment of the present invention;

Throughout the drawings, like drawing reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

Although specific communication standard and channel structure will be considered in the following description of a proposed operation of providing relay services in a wireless communication system, it will be understood by those of ordinary skill in the art that the proposed relay operation is not limited to specific communication protocol or system configuration.

Asynchronous Frequency Division Duplex (FDD) or Time Division Duplex (TDD) Uplink (UL) frame structures in a wireless communication system employing a relay scheme will be described below. Generally, a Relay Station (RS) may not simultaneously perform a transmission mode and a reception mode. In a UL, the RS operates in the reception mode when receiving data from an MS, and operates in the transmission mode when transmitting data to a Base Station (BS) over the UL.

Figure 2:
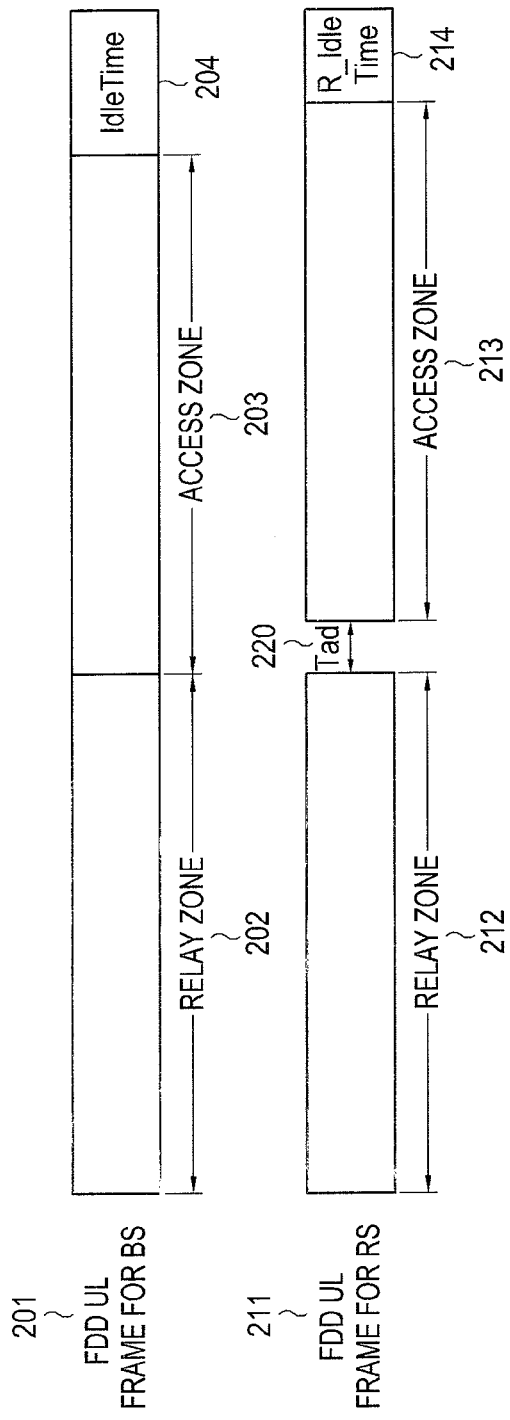
FIG. 2 illustrates structures of asynchronous Frequency Division Duplex (FDD) Uplink (UL) frames used in a Base Station (BS) and a Relay Station (RS) according to an exemplary embodiment of the present invention.

FIG. 2 illustrates structures of asynchronous FDD UL frames used in a BS and an RS according to an exemplary embodiment of the present invention.

Referring to FIG. 2, FDD UL frame 201 for a BS and FDD UL frame 211 for an RS include relay zones 202 and 212, and access zones 203 and 213, respectively. In the relay zones 202 and 212, the RS transmits data to the BS, and in the access zones 203 and 213, the RS receives data from a Mobile Station (MS).

In the UL, since the BS always operates in both a reception mode and a transmission mode, the FDD UL frame 201 for a BS does not require a transmit/receive transition time. On the other hand, in the FDD UL frame 211 for an RS, since the relay zone 212 corresponds to the transmission mode and the access zone 213 corresponds to the reception mode, a transmit/receive transition time is required between the two zones 212 and 213. To secure the transmit/receive transition time without overhead, a start timing of the access zone 213 for an RS is delayed by an amount of time Tad 220. In this manner, the RS may secure a transmit/receive transition time in the UL.

To synchronize the FDD UL frame 201 for a BS with the FDD UL frame 211 for an RS, the FDD UL frame 211 for an RS has a R_IdleTime 214 added to the end of the FDD UL frame 211, and the FDD UL frame 201 for a BS has an IdleTime added to the end of the FDD UL frame 201. The R_IdleTime 214 is shorter than IdleTime 204. In other words, Tad=IdleTime−R_IdleTime. The IdleTime 204 and the R_IdleTime 214 mean idle times which are inserted between consecutive frames to prevent interference between UL frames.

The IdleTime 204 corresponds to the system information that a BS broadcasts to an RS and an MS in a network entry process, and the R_IdleTime 214 corresponds to information that is received at the RS from the BS. In other words, the RS receives the IdleTime 204 and the R_IdleTime 214 from the BS, and determines Tad by a difference between the IdleTime 204 and the R_IdleTime 214.

Figure 3:
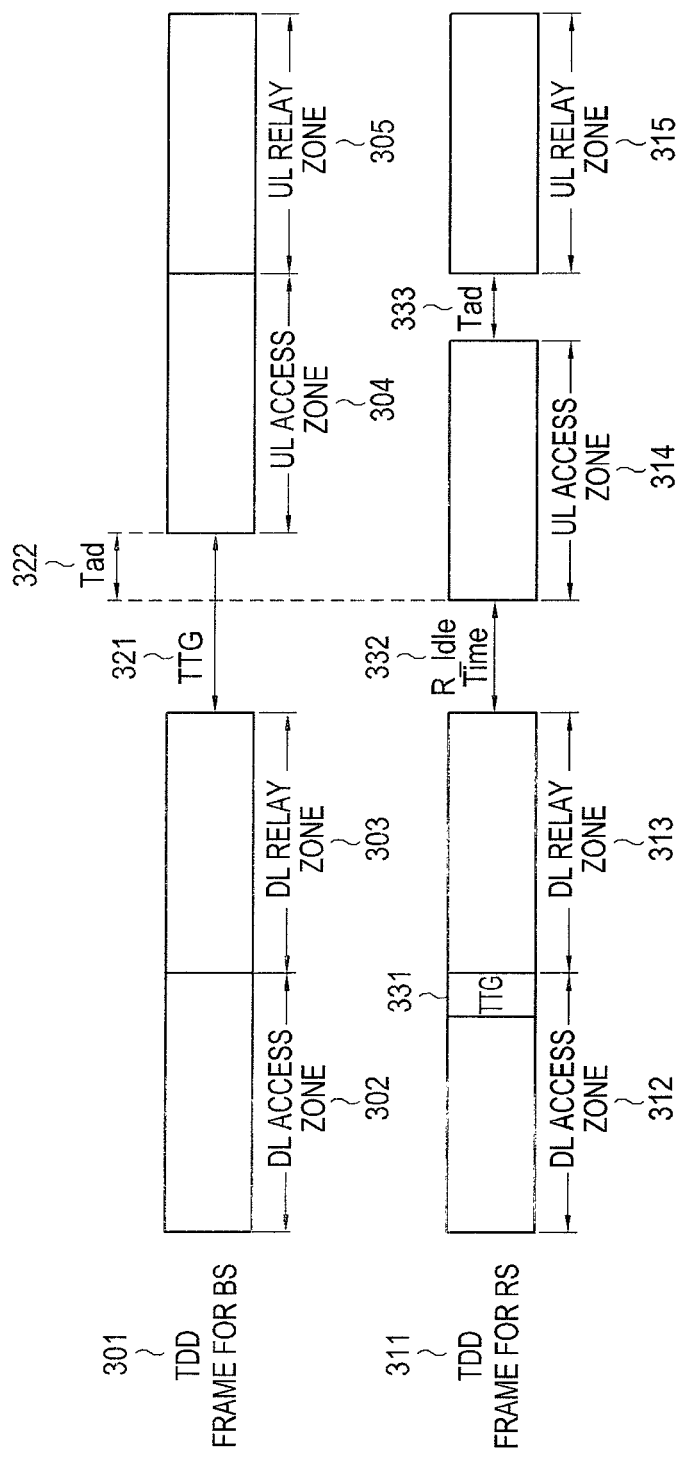
FIG. 3 illustrates structures of asynchronous Time Division Duplex (TDD) frames used in a BS and an RS according to an exemplary embodiment of the present invention.

FIG. 3 illustrates structures of asynchronous TDD frames used in a BS and an RS according to an exemplary embodiment of the present invention.

Referring to FIG. 3, a BS TDD frame 301 includes a Downlink (DL) access zone 302, a DL relay zone 303, a transmit/receive transition time which is shown as a Transmit/receive Transition Gap (TTG) 321 for a BS, a UL access zone 304, and a UL relay zone 305. An RS TDD frame 311 includes a DL access zone 312, a DL relay zone 313, an R_IdleTime 332, a UL access zone 314, and a UL relay zone 315.

In the BS TDD frame 301, a transmit to receive transition is required during a transition from a DL to a UL. In the RS TDD frame 311, a transition from the transmission mode to the reception mode occurs just before the DL relay zone 313 starts and during a TTG 331 of the DL access zone 312. A transition from the reception mode to the transmission mode occurs in the time delay Tad 333, which is between the UL access zone 314 and the UL relay zone 315. For the transition from the transmission mode to the reception mode, the DL access zone 312 of the RS TDD frame 311 is configured to terminate with the TTG 331, including one or more Orthogonal Frequency Division Multiplexing (OFDM) symbols. In the UL frames 314 and 315, if the UL access zone 314 for an RS starts earlier than the UL access zone 304 for a BS by an amount of time equal to Tad 322, then a time gap of Tad 333 occurs between the UL access zone 314 and the UL relay zone 315. Accordingly, the RS may transition from the reception mode to the transmission mode without a waste of OFDM symbols. The value of Tad may be expressed as Tad=TTG (321)−R_IdleTime (332).

The TTG 321 corresponds to the system information that a BS broadcasts to an RS and an MS in a network entry process, and the R_IdleTime 332 corresponds to the information that is received at the RS from the BS. In other words, the RS receives the TTG 321 and the R_IdleTime 332 from the BS, and determines the Tad by a difference between the TTG 321 and the R_IdleTime 332.

Figure 1A:
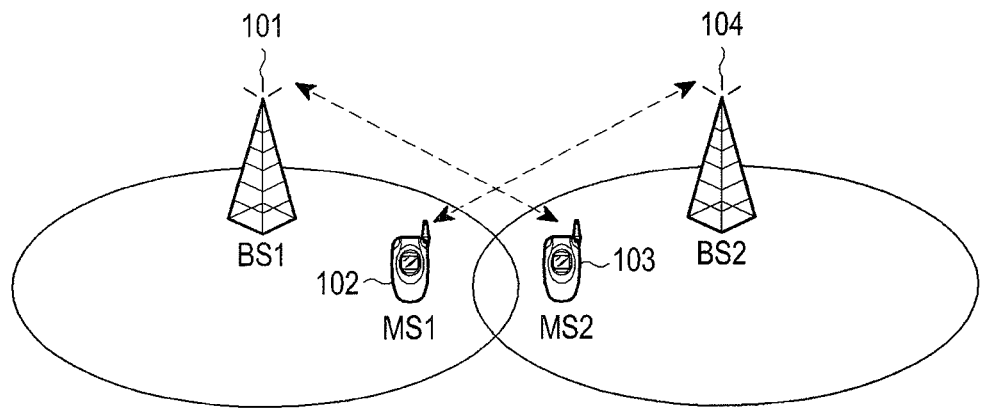
FIGS. 1A and 1B illustrate interference occurring in a wireless communication system and a relay communication system according to the related art, respectively.
Figure 1B:
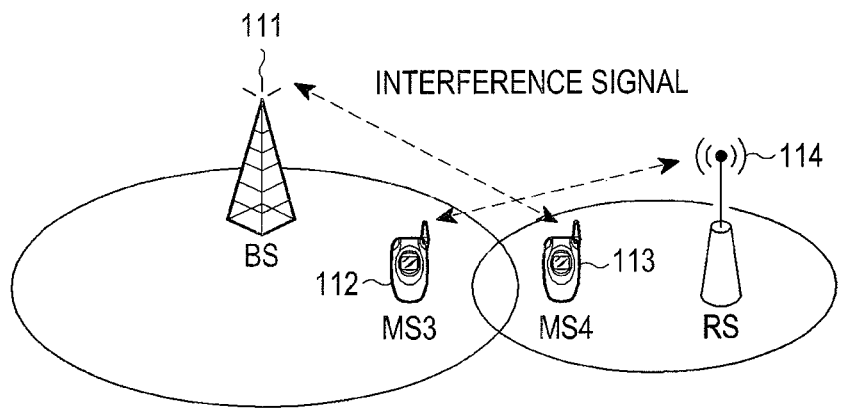

If the UL frame for an RS starts earlier or later than the UL frame for a BS by an amount of time equal to Tad, as shown in FIGS. 2 and 3, a waste of OFDM symbols may not occur during the RS's transition from the transmission mode to the reception mode or during transition from the reception mode to the transmission mode. Even in this case, however, inter-cell interference may occur between a BS frame and an RS frame, as was shown in FIGS. 1A and 1B. An exemplary embodiment described below proposes a scheme of properly setting a Tad to prevent occurrence of inter-cell interference.

Figure 4:
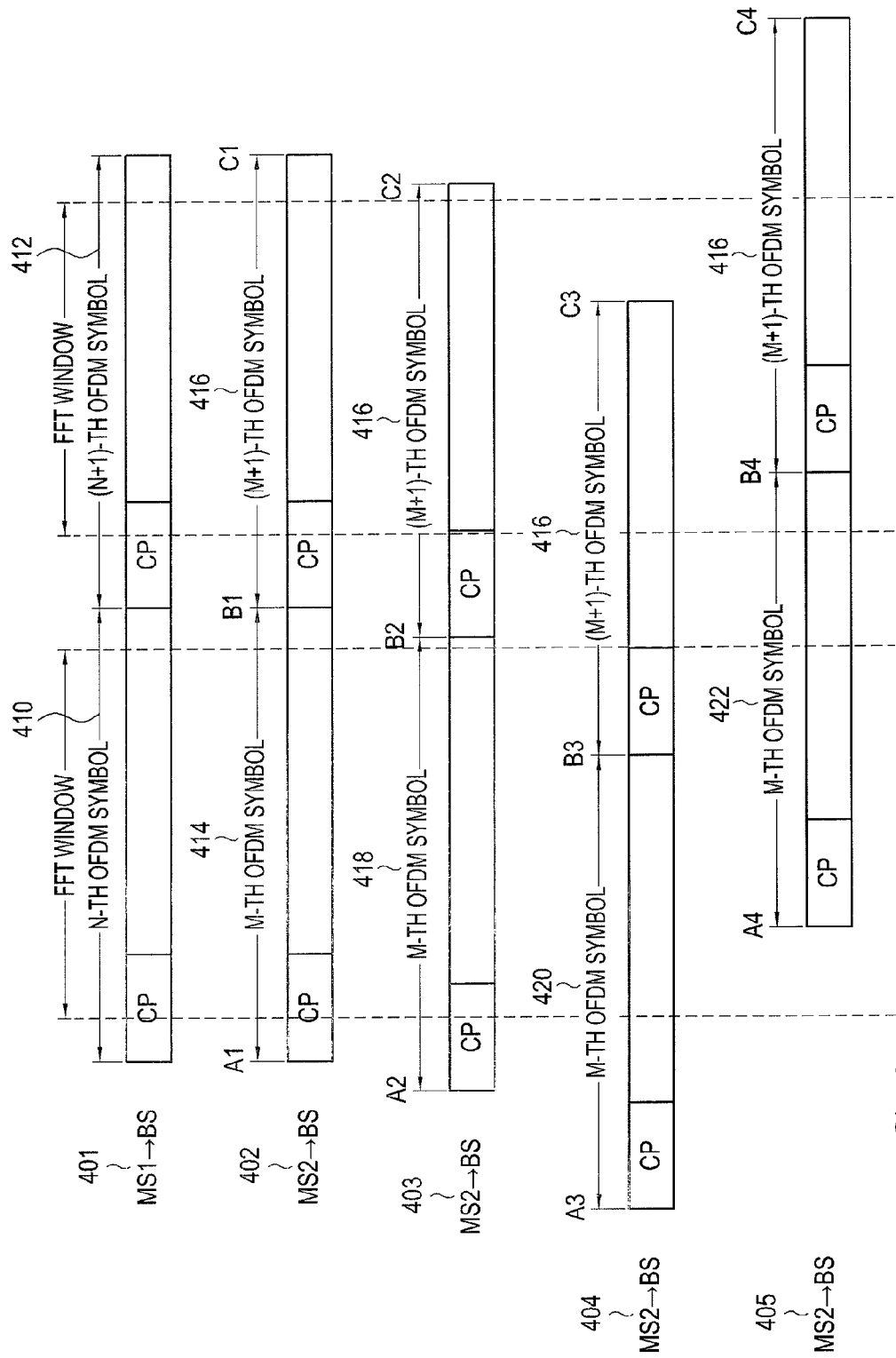
FIG. 4 illustrates a process of demodulating UL Orthogonal Frequency Division Multiplexing (OFDM) symbols in an OFDM communication system according to an exemplary embodiment of the present invention.

FIG. 4 illustrates a process of demodulating UL OFDM symbols in an OFDM communication system according to an exemplary embodiment of the present invention.

Referring to FIG. 4, an MS1 is served by a BS and an MS2 is served by an adjacent station, such as an adjacent BS or adjacent RS. Reference numeral 401 represents a time at which an N-th OFDM symbol 410 and an (N+1)-th OFDM symbol 412, transmitted by the MS1 to the BS, are received at the BS. Upon receiving the N-th OFDM symbol 410 and the (N+1)-th OFDM symbol 412, the BS takes samples corresponding to a Fast Fourier Transform (FFT) window within a range of each of the symbols 410 and 412, and restores a transmission signal by FFT. Generally, a size of the FFT window is the same as a size of a portion of an OFDM symbol obtained by excepting Cyclic Prefix (CP) from the OFDM symbol. While receiving the N-th OFDM symbol 410 and the (N+1)-th OFDM symbol 412 from the MS1, the BS continuously receives M-th OFDM symbols 414, 418, 420 and 422, and an (M+1)-th OFDM symbol 416 from the MS2. A signal from the MS2 is regarded as interference, and should be removed, because it is not a signal that the BS desires to demodulate. Depending on the timings at which the OFDM symbols from the MS2 arrive at the BS, interference at the BS is different, as illustrated with respect to reference numerals 402 to 405 in FIG. 4.

In a process of demodulating an OFDM symbol, it is very important to maintain orthogonality of sub-carriers constituting the OFDM symbol. To maintain the orthogonality of the sub-carriers, a change in phase of an interference signal should be prevented within an FFT window during the demodulation. The change in phase generally occurs between OFDM symbols.

Reference numeral 402 represents a case where the OFDM symbols 414 and 416 from the MS2 arrive at the BS at the same timing as that of the OFDM symbols 410 and 412 transmitted from the MS1 to the BS. In this case, a change in phase occurs at several locations, including at a starting point 'A1' of the M-th OFDM symbol 414, at 'B1' which is an end point of the M-th OFDM symbol 414, at a starting point of the (M+1)-th OFDM symbol 416, and at an end point 'C1' of the (M+1)-th OFDM symbol 416. In the case shown by reference numeral 402, because all of 'A1', 'B1', and 'C1' are placed outside of the FFT windows of the N-th and (N+1)-th OFDM symbols 410 and 412, the M-th and (M+1)-th OFDM symbols 414 and 416 do not interfere with the OFDM symbols 410 and 412 that the BS receives from the MS1.

Reference numeral 403 represents a case where the M-th OFDM symbol 418 from the MS2 arrives earlier than the N-th OFDM symbol 410. Even in this case, since all of a starting point 'A2' of the M-th OFDM symbol 418, a point 'B2' which is an end point of the M-th OFDM symbol 418 and a starting point of the (M+1)-th OFDM symbol, and an end point 'C2' of the (M+1)-th OFDM symbol 416, are placed outside of the FFT windows of the N-th and (N+1)-th OFDM symbols 410 and 412 from the MS1, the M-th and (M+1)-th OFDM symbols 418 and 416 do not interfere with the OFDM symbols 410 and 412 that the BS receives from the MS1.

Reference numeral 404 represents a case where the M-th OFDM symbol 420 from the MS2 arrives earlier than the N-th OFDM symbol 410. In this case, since 'B3' which is an end point of the M-th OFDM symbol 420 and a starting point of the (M+1)-th OFDM symbol, and an end point 'C3' of the (M+1)-th OFDM symbol 416, are present within the FFT windows of the N-th and (N+1)-th OFDM symbols 410 and 412, interference occurs in the OFDM symbols 410 and 412 transmitted by the MS1, thus damaging the orthogonality of the sub-carriers.

Reference numeral 405 represents a case where the M-th OFDM symbol 422 from the MS2 arrives later than the N-th OFDM symbol 410. Even in this case, since a starting point 'A4' of the M-th OFDM symbol 422, and 'B4' which is an end point of the M-th OFDM symbol 418, and a starting point of the (M+1)-th OFDM symbol 416, are present within the FFT windows of the N-th and (N+1)-th OFDM symbols 410 and 412, interference occurs in the OFDM symbols 410 and 412 transmitted by the MS1, thus damaging the orthogonality of the sub-carriers.

To demodulate the OFDM symbols transmitted by the MS1 without interference, it is necessary to limit the UL transmission timing in an adjacent station, such as a BS or an RS. The Tad between UL access zones and relay zones for an RS is required to be determined in order to minimize inter-cell interference.

FIGS. 5A and 5B illustrate UL frames received at an adjacent station in an OFDM communication system according to an exemplary embodiment of the present invention.

Referring to FIGS. 5A and 5B, an MS1 is served by a BS and an MS2 is served by an adjacent station, such as an adjacent BS or an adjacent RS. Reference numerals 501 and 503 represent times at which an N-th OFDM symbol 510 and an (N+1)-th OFDM symbol 512 that the MS1 has transmitted, are received at the BS.

Referring to FIG. 5A, reference numeral 502 represents a time at which the BS receives an M-th OFDM symbol 514 and an (M+1)-th OFDM symbol 516 that the MS2 has transmitted to an adjacent station. In the case where the MS2 has transmitted the M-th and (M+1)-th OFDM symbols 514 and 516 earlier than the N-th and (N+1)-th OFDM symbols 510 and 512 by a time delay of Tad, the Tad should be greater than or equal to '0' and less than or equal to 'CP', or in other words, 0≤Tad≤CP, in order to prevent interference between OFDM symbols. Thus, it is possible to prevent the orthogonality of OFDM symbols from being damaged within the FFT windows.

Referring to FIG. 5B, in the case shown by reference numerals 503 and 504 and in which the MS2 transmits OFDM symbols 518 and 520 to an adjacent station with a time delay of Tad, the Tad should be greater than or equal to '0' and less than or equal to 'CP', or in other words, 0≤Tad≤CP, in order to prevent the orthogonality of OFDM symbols from being damaged within the FFT windows.

Figure 6A:
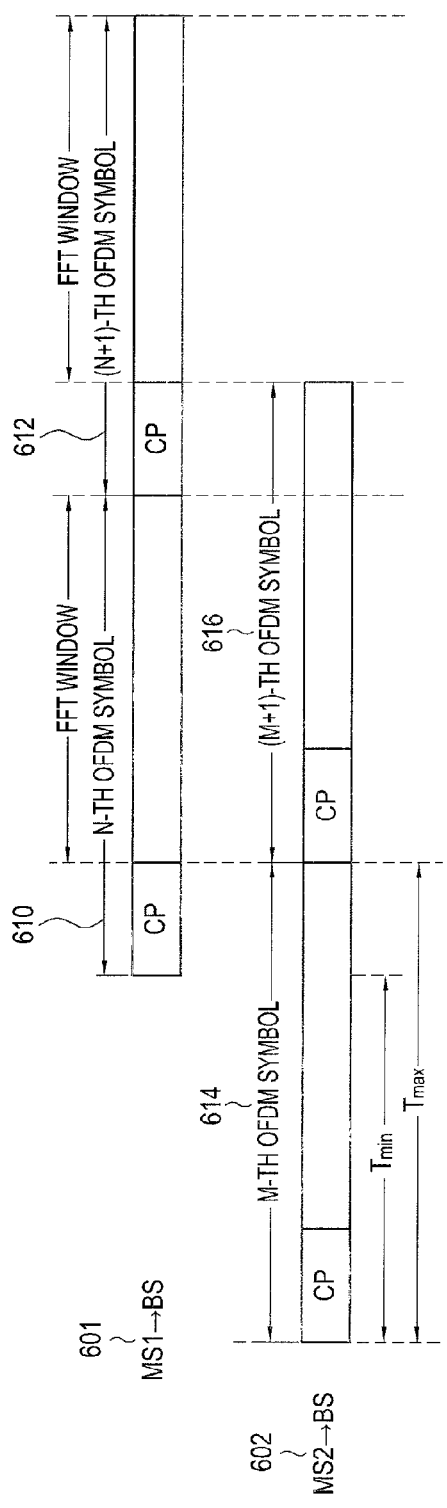
FIGS. 6A and 6B illustrate UL frames received at an adjacent station in an OFDM communication system according to another exemplary embodiment of the present invention.
Figure 6B:
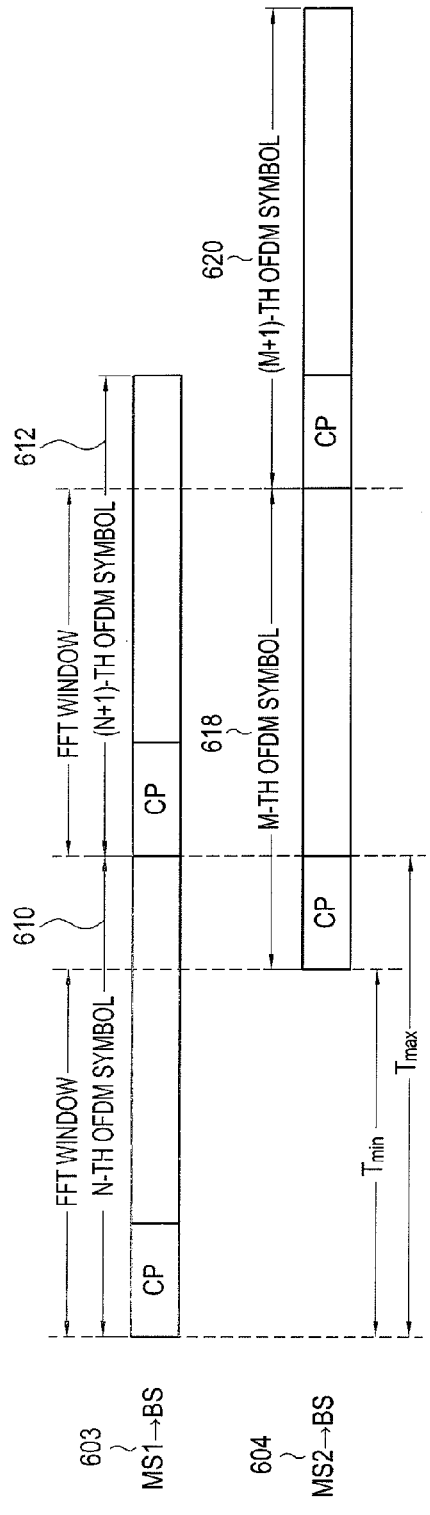

FIGS. 6A and 6B illustrate UL frames received at an adjacent station in an OFDM communication system according to another exemplary embodiment of the present invention.

Referring to FIGS. 6A and 6B, an MS1 is served by a BS and an MS2 is served by an adjacent station, such as an adjacent BS or an adjacent RS. Reference numerals 601 and 603 represent times at which an N-th OFDM symbol 610 and an (N+1)-th OFDM symbol 612, transmitted by the MS1, are received at the BS.

Referring to FIG. 6A, reference numeral 602 represents a time at which the BS receives an M-th OFDM symbol 614 and an (M+1)-th OFDM symbol 616 that the MS2 transmits to an adjacent station. In the case where the MS2 has transmitted the M-th and (M+1)-th OFDM symbols 614 and 616 earlier than the N-th and (N+1)-th OFDM symbols 610 and 612 by an amount of time equal to a time delay Tad, the Tad should be greater than or equal to 'one OFDM symbol-CP length' and less than or equal to 'one OFDM symbol' in order to prevent interference between OFDM symbols. Accordingly, it is possible to prevent the orthogonality of OFDM symbols from being damaged within the FFT windows.

Referring to FIG. 6B, in the case shown by reference numerals 603 and 604, and in which the MS2 transmits OFDM symbols 618 and 620 to an adjacent station with a time delay of Tad, the Tad should be greater than or equal to 'one OFDM symbol-CP length' and less than or equal to 'one OFDM symbol' in order to prevent the orthogonality of OFDM symbols from being damaged within FFT windows.

When the time delay of Tad is set to be in RS frames, as shown in FIGS. 5A to 6B, the Tad may be set in two different manners in accordance with Equation (1) and Equation (2) below.

$$0 \le \text{Tad} \le CP(Ts-Tb)$$

$$Tb \le \text{Tad} \le Ts \quad (1)$$

$$\text{IdleTime(or } TTG)-(Ts-Tb) \le R\_\text{IdleTime} \le \text{IdleTime(or } TTG)$$

$$\text{IdleTime(or } TTG)-Ts \le R\_\text{IdleTime} \le \text{IdleTime(or } TTG)-Tb \quad (2)$$

where Ts represents a length of an OFDM symbol, and Tb represents a length of a portion of an OFDM symbol obtained by excepting CP from the OFDM symbol. The above equations may be expressed with IdleTime, TTG, and R_IdleTime, as shown and referred to in FIGS. 3 and 4.

Figure 7A:
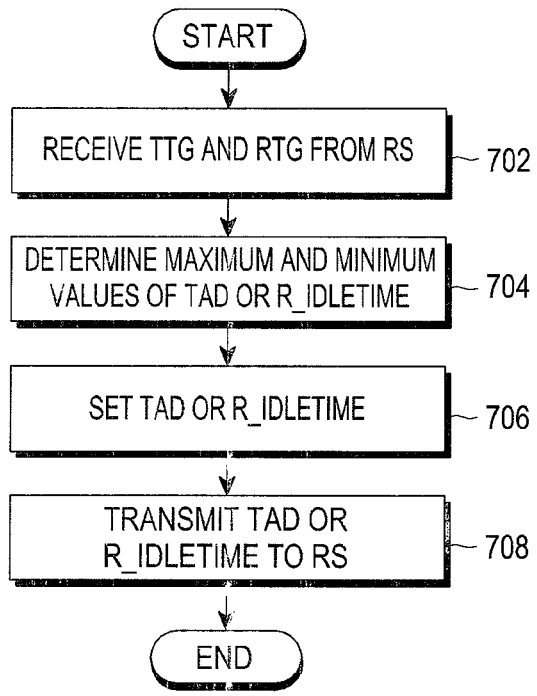
FIGS. 7A and 7B illustrate UL communication operations by a BS and an RS in setting RS frames in the BS according to an exemplary embodiment of the present invention.
Figure 7B:
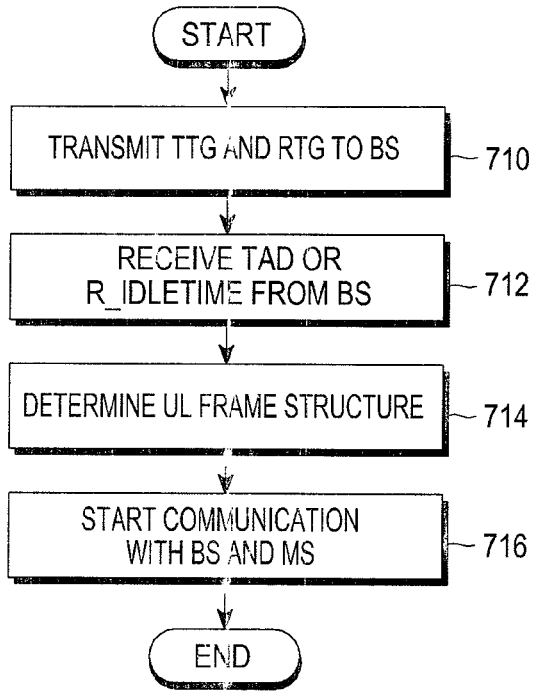

FIGS. 7A and 7B illustrate UL communication operations by a BS and an RS in setting RS frames in the BS according to an exemplary embodiment of the present invention.

Referring to FIG. 7A, in step 702, the BS receives a Transmit/receive Transition Gap (TTG), which is an amount of time required to transition from the transmission mode to the reception mode, and a Receive/transmit Transition Gap (RTG), which is an amount of time required to transition from the reception mode to the transmission mode, from the RS during a network entry process of the RS. In step 704, the BS determines maximum and minimum values of time delays Tad or R_IdleTime, as defined in Equation (1) and Equation (2). After determining the TTG, the RTG, and a range for the Tad or the R_IdleTime, the BS sets the Tad or the R_IdleTime for an RS in step 706. Next, the BS transmits the set Tad or R_IdleTime to the RS in step 708. Thereafter, the BS communicates with the RS using the UL frames determined depending on the Tad or the R_IdleTime.

Referring to FIG. 7B, the RS transmits its TTG and RTG to the BS in the network entry process in step 710, and receives a time delay Tad or R_IdleTime, as determined by the BS, in step 712. The RS determines a structure of a UL frame using the received Tad or R_IdleTime in step 714. Next, the RS communicates with the BS and an MS using the determined UL frame structure in step 716.

Figure 8A:
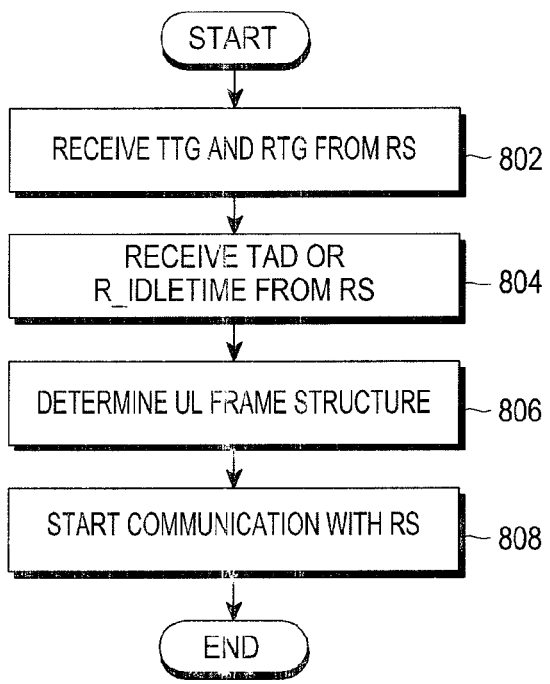
FIGS. 8A and 8B illustrate UL communication operations by a BS and an RS in setting RS frames in the RS according to another exemplary embodiment of the present invention.
Figure 8B:
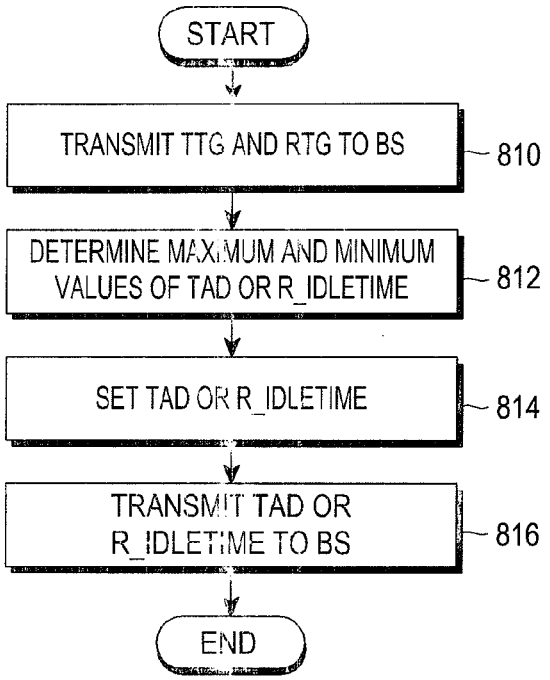

FIGS. 8A and 8B illustrate UL communication operations by a BS and an RS in setting RS frames in the RS according to another exemplary embodiment of the present invention.

Referring to FIG. 8A, in step 802, the BS receives a TTG, which is an amount of time required to transition from the transmission mode to the reception mode, and an RTG, which is an amount of time required to transition from the reception mode to the transmission mode, from the RS during a network entry process of the RS. In step 804, the BS receives the time delay Tad or R_IdleTime, as determined by the RS. The BS determines a structure of a UL frame using the received Tad or R_IdleTime in step 806, and communicates with the RS using the determined UL frame structure in step 808.

Referring to FIG. 8B, the RS transmits its TTG and RTG to the BS during a network entry process in step 810, and determines the maximum and minimum values of Tad or R_IdleTime in accordance with Equation (1) and Equation (2) in step 812. After determining the TTG, the RTG, and a range for the Tad or the R_IdleTime, the RS sets the Tad or R_IdleTime for an RS in step 814, and transmits the set Tad or R_IdleTime to the BS in step 816. Thereafter, the RS communicates with the BS and an MS using the UL frames that were determined using the Tad or R_IdleTime.

Figure 9:
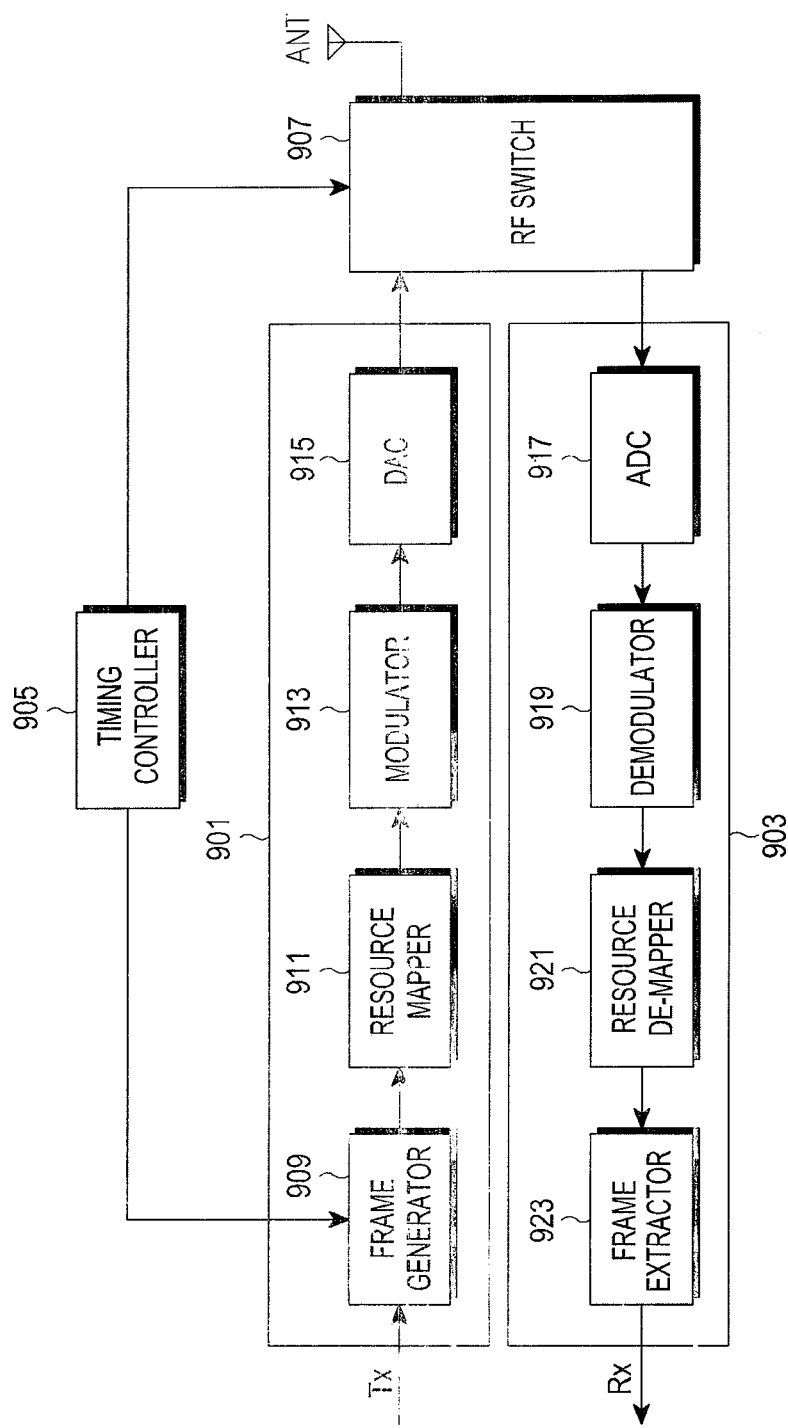
FIG. 9 illustrates a structure of an RS in a wireless communication system according to an exemplary embodiment of the present invention.

FIG. 9 illustrates a structure of an RS in a wireless communication system according to an exemplary embodiment of the present invention.

Referring to FIG. 9, the RS includes a transmission device 901, a reception device 903, a timing controller 905, and a Radio Frequency (RF) switch 907.

The transmission device 901 includes a frame generator 909, a resource mapper 911, a modulator 913, and a Digital/Analog Converter (DAC) 915.

The frame generator 909 generates a frame according to a control signal provided from the timing controller 905. For example, based on a time delay Tad or R_IdleTime, the frame generator 909 generates UL frames so as to not have a TTG or an RTG for an RS, as illustrated in FIGS. 2 and 3. The Tad or R_IdleTime is set to be within a range of maximum and minimum values in Equation (1) or Equation (2), or the Tad or the R_IdleTime is a set value received from a BS.

The resource mapper 911 allocates frames provided from the frame generator 909 to a burst of an associated link. The modulator 913 modulates the frames which are allocated to a burst of each link and provided from the resource mapper 911 according to a pertinent Modulation and Coding Scheme (MCS) level. The DAC 915 converts a digital signal provided from the modulator 913 into an analog signal, and provides the analog signal to the RF switch 907. The RF switch 907 converts the analog signal into an RF signal and transmits the RF signal via an antenna ANT.

The reception device 903 includes an Analog/Digital Converter (ADC) 917, a demodulator 919, a resource de-mapper 921, and a frame extractor 923.

The ADC 917 converts an analog signal received through the RF switch 907 into a digital signal. The demodulator 919 demodulates the digital signal provided from the ADC 917 according to a pertinent MCS level. The resource de-mapper 921 extracts frames, which are allocated to a burst of each link and provided from the demodulator 919. The frame extractor 923 extracts a frame for an RS from the frame provided from the resource de-mapper 921.

The RF switch 907 connects or switches the signals exchanged with a BS, an MS and another RS, to the transmission device 901 and the reception device 903 under a control of the timing controller 905.

The timing controller 905 determines a structure and timing of a frame so as to not have the TTG or the RTG for an RS using the Tad or the R_IdleTime in a UL frame configured, as illustrated in FIG. 2 or 3. The Tad or R_IdleTime it is set to be within a range of maximum and minimum values in Equation (1) or Equation (2), or the Tad or the R_IdleTime is a set value is received from a BS.

The timing controller 905 generates a control signal for transmitting and receiving signals according to the frame configuration scheme. Specifically, based on information about the TTG and the RTG for an RS, the timing controller 905 generates a control signal so that the transmission device 901 and the reception device 903 may perform mode transition.

As is apparent from the foregoing description, the present invention may reduce the overhead for unnecessary mode transition of an RS and minimize interference at a BS in a wireless communication system employing a relay scheme, thereby contributing to an increase in data transmission efficiency of the system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing Uplink (UL) communication by a Relay Station (RS) in a wireless communication system, the method comprising:

constructing a Frequency Division Duplex (FDD) frame comprising a first area supporting a transmission of the RS and a second area supporting a reception of the RS; and performing UL communication by using the FDD frame, wherein a time interval that is disposed between the first area and the second area in the FDD frame is determined based on a difference between a first idle time interval and a second idle time interval, and wherein the first idle time interval is disposed between FDD frames used in a Base Station (BS) and the second idle time interval is disposed between FDD frames used in the RS.

2. The method of claim 1, wherein the time interval Tad is determined to be within a range defined according to the following equation:

$$0 \leq \text{Tad} \leq CP(Ts-Tb) \text{ or } Tb \leq \text{Tad} \leq Ts,$$

wherein Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

3. The method of claim 1, wherein the second idle time interval $R_{13}$ IdleTime is determined within a range defined according to the following equation:

$$\text{IdleTime(or } TTG) - (Ts-Tb) \leq R\_\text{IdleTime} \leq \text{IdleTime(or } TTG),$$

$$\text{IdleTime( or } TTG) - Ts \leq R\_\text{IdleTime} \leq \text{IdleTime(or } TTG) - Tb,$$

wherein IdleTime represents the first idle time interval, Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

4. A method for performing Uplink (UL) communication by a Relay Station (RS) in a wireless communication system, the method comprising:

constructing a Time Division Duplex (TDD) scheme comprising a first area supporting a transmission of the RS and a second area supporting a reception of the RS; and performing UL communication by using the TDD frame, wherein a time interval that is disposed between the first area and the second area in the TDD frame is determined based on a difference between a first idle time interval and a second idle time interval, and wherein the first idle time interval is disposed between TDD frames used in a Base Station (BS) and the second idle time interval is disposed between TDD frames used in the RS.

5. The method of claim 4, wherein the time interval Tad is determined to be within a range defined according to the following equation:

$$0 \leq \text{Tad} \leq CP(Ts-Tb) \text{ or } Tb \leq \text{Tad} \leq Ts,$$

wherein Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

6. The method of claim 4, wherein the second idle time interval R_IdleTime is determined to be within a range defined according to the following equation:

$$\text{IdleTime(or } TTG)-(Ts-Tb) \leq R\_\text{IdleTime} \leq \text{IdleTime(or } TTG),$$

$$\text{IdleTime( or } TTG)-Ts \leq R\_\text{IdleTime} \leq \text{IdleTime(or } TTG)-Tb,$$

wherein IdleTime represents the first idle time interval, Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

7. A Relay Station (RS) apparatus for performing Uplink (UL) communication in a wireless communication system, the apparatus comprising:
  a controller configured to construct a Frequency Division Duplex (FDD) frame comprising a first area supporting a transmission of the RS and a second area supporting a reception of the RS; and
  a communication unit configured to perform UL communication by using the FDD frame,
  wherein a time interval that is disposed between the first area and the second area in the FDD frame is determined based on a difference between a first idle time interval and a second idle time interval, and
  wherein the first idle time interval is disposed between FDD frames used in a Base Station (BS) and the second idle time interval is disposed between FDD frames used in the RS.

8. The apparatus of claim 7, wherein the time interval Tad is determined to be within a range defined according to the following equation:

$$0 \leq \text{Tad} \leq CP(Ts-Tb) \text{ or } Tb \leq \text{Tad} \leq Ts,$$

wherein Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

9. The apparatus of claim 7, wherein the second idle time interval R_IdleTime is determined to be within a range defined according to the following equation:

$$\text{IdleTime(or } TTG)-(Ts-Tb) \leq R\_\text{IdleTime} \leq \text{IdleTime(or } TTG),$$

$$\text{IdleTime( or } TTG)-Ts \leq R\_\text{IdleTime} \leq \text{IdleTime(or } TTG)-Tb,$$

wherein IdleTime represents the first idle time interval, Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

10. A Relay Station (RS) apparatus for performing Uplink (UL) communication in a wireless communication system using Time Division Duplex (TDD) scheme, the apparatus comprising:
  a controller configured construct a Time Division Duplex (TDD) scheme comprising a first area supporting a transmission of the RS and a second area supporting a reception of the RS; and
  a communication unit configured to perform UL communication by using the TDD frame,
  wherein a time interval that is disposed between the first area and the second area in the TDD frame is determined based on a difference between a first idle time interval and a second idle time interval, and
  wherein the first idle time interval is disposed between TDD frames used in a Base Station (BS) and the second idle time interval is disposed between TDD frames used in the RS.

11. The apparatus of claim 10, wherein the time interval Tad is determined to be within a range defined according to the following equation:

$$0 \leq \text{Tad} \leq CP(Ts-Tb) \text{ or } Tb \leq \text{Tad} \leq Ts,$$

wherein Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

12. The apparatus of claim 10, wherein the second idle time interval R_IdleTime is determined to be within a range defined in accordance with the following equation:

$$\text{IdleTime(or } TTG)-(Ts-Tb) \leq R\_\text{IdleTime} \leq \text{IdleTime(or } TTG),$$

$$\text{IdleTime( or } TTG)-Ts \leq R\_\text{IdleTime} \leq \text{IdleTime(or } TTG)-Tb,$$

wherein IdleTime represents the first idle time interval, Ts represents a length of an Orthogonal Frequency Division Multiplexing (OFDM) symbol, and Tb represents a length of a portion of the OFDM symbol obtained by excepting a Cyclic Prefix (CP) from the OFDM symbol.

* * * * *